(12) United States Patent
Trompke

(10) Patent No.: US 6,840,197 B1
(45) Date of Patent: Jan. 11, 2005

(54) MEANS AND A METHOD FOR TRAINING DOGS TO HUNT

(76) Inventor: Timothy L. Trompke, 1904 7th Ave., Kearney, NE (US) 68845

( * ) Notice: Subject to any disclaimer, the term of this patent is extended or adjusted under 35 U.S.C. 154(b) by 0 days.

(21) Appl. No.: 10/391,361

(22) Filed: Mar. 21, 2003

(51) Int. Cl.7 .............................................. A01K 29/00
(52) U.S. Cl. .............................................. 119/711; 43/3
(58) Field of Search ................................ 119/711, 709; 43/2, 3; 446/268, 369

(56) References Cited

U.S. PATENT DOCUMENTS

| | | | | |
|---|---|---|---|---|
| 1,732,316 A | * | 10/1929 | Scott ................................ 43/3 |
| 2,222,996 A | * | 11/1940 | Armstrong ........................ 43/3 |
| 2,618,892 A | * | 11/1952 | Locks et al. ................... 446/268 |
| 3,460,286 A | * | 8/1969 | Danberg ...................... 446/153 |
| 3,955,314 A | * | 5/1976 | Robb ............................ 446/72 |
| 4,413,442 A | * | 11/1983 | McSweeney ................. 446/73 |
| 4,715,840 A | * | 12/1987 | Swift ............................ 446/74 |
| 4,889,284 A | * | 12/1989 | Spector ........................ 239/34 |
| 5,037,343 A | * | 8/1991 | Benites ........................ 446/268 |
| 5,199,204 A | * | 4/1993 | Lowery ............................ 43/2 |
| 5,415,132 A | | 5/1995 | Meyer |
| 5,613,317 A | * | 3/1997 | Ninegar ............................ 43/3 |
| 5,676,583 A | * | 10/1997 | Wang et al. ................. 446/268 |
| 5,706,762 A | * | 1/1998 | Dokken ....................... 119/712 |
| 5,826,364 A | | 10/1998 | Bitting |
| 6,012,963 A | * | 1/2000 | Lee ............................. 446/385 |
| 6,021,594 A | * | 2/2000 | Krueger ........................... 43/2 |
| 6,089,947 A | | 7/2000 | Green |
| 6,115,953 A | * | 9/2000 | Wise ............................... 43/2 |
| 6,216,382 B1 | * | 4/2001 | Lindaman ........................ 43/2 |
| 6,520,826 B2 | * | 2/2003 | Spector ........................ 446/73 |
| 6,681,721 B1 | * | 1/2004 | Buschy ........................ 119/709 |
| 6,698,132 B1 | * | 3/2004 | Brint .............................. 43/2 |
| 6,699,090 B1 | * | 3/2004 | Vick ............................ 446/73 |
| 6,709,310 B1 | * | 3/2004 | Pietrafesa .................... 446/305 |
| 2002/0123295 A1 | * | 9/2002 | Spector ...................... 446/268 |
| 2002/0178638 A1 | * | 12/2002 | Fulcher ........................... 43/2 |
| 2003/0068955 A1 | * | 4/2003 | Vick ............................ 446/369 |
| 2003/0224692 A1 | * | 12/2003 | Hidalgo ...................... 446/369 |

* cited by examiner

Primary Examiner—Michael J. Carone
Assistant Examiner—Jordan Lofdahl
(74) Attorney, Agent, or Firm—Terry M Gernstein

(57) ABSTRACT

A dog is trained to hunt by using a unit that resembles a bird first as a toy and then as a training element. The dog identifies the unit as a toy and the training method uses this association to teach the dog to retrieve and point as well as the other skills associated with hunting. The training can begin when the dog is a young puppy.

9 Claims, 6 Drawing Sheets

A) when the dog is less than one year old, teaching the dog to identify a bird by
  (1) providing a unit that duplicates an anatomically correct bird by
    (a) making a body from cloth material and making the body anatomically correct for the bird,
    (b) filling the body with polyester material,
    (c) forming a tail section of cloth material and forming the tail section to be anatomically correct for the bird,
    (d) attaching the tail section to one end of the body,
    (e) forming two wings, and forming each wing to be anatomically correct for the bird,
    (f) hingeably attaching each wing to the body and permitting each wing to move toward and away from the body,
    (g) tethering one of the wings to the body,
    (h) forming a neck section to be anatomically correct for the bird,
    (i) attaching the neck section to an end of the body,
    (j) forming a head section to be antomically correct for the bird,
    (k) attaching the head section to the neck section,
    (l) forming a beak section to be anatomically correct for the bird,
    (m) attaching the beak section to the head section, and
    (n) forming a pocket in the body,
  (2) showing the unit to the dog,
  (3) pushing the unit against the dog,
  (4) allowing the dog to grasp the unit,
  (5) preventing the dog from biting the unit,
  (6) preventing the dog from chewing on the unit,
  (7) allowing the dog to play with the unit, and
  (8) preventing the dog from tugging on the unit.

B) after the dog has identified the unit as a toy, teaching the dog to find the unit by showing the unit to the dog and throwing the unit so the dog can see the unit land.

C) after the dog has been taught to find the unit, teaching the dog to retrieve the unit by rewarding the dog when the dog brings the unit back to the person who has thrown the unit.

FIG.8A

D) after the dog has been taught to find the unit, teaching the dog to find a unit that is hidden from the dog by waiting until the dog is not looking at the unit and then throwing the unit so the dog cannot see it land and commanding the dog to find and point the unit and then rewarding the dog when the dog finds and retrieves the unit.

E) after the dog has been taught to find a unit that is hidden from the dog, teaching the dog to approach a moving unit by
  (1) tying a tether to the neck section of the unit,
  (2) throwing the unit,
  (3) as soon as the dog finds the thrown unit and approaches the unit, pulling on the tether to move the unit, and
  (4) when the dog points the moving unit, rewarding the dog;

F) storing the unit in an air-impervious container between uses;

G) storing the pocket in the body of the unit;

H) after the dog has reached about one month in age, using the pocket to teach the dog to use its sense of smell by
  (1) placing scent on the pocket, and having the scent match of the bird,
  (2) throwing the unit when the dog is not looking,
  (3) commanding the dog to find the unit, and
  (4) rewarding the dog when the unit is retrieved to the person throwing the unit;

I) refreashing and reinforcing the dog's skills by repeating the steps of teaching the dog to retrieve the unit, teaching the dog to find the unit, to point and teaching the dog to use its sense of smell during the dog's lifetime.

FIG. 8B

MEANS AND A METHOD FOR TRAINING DOGS TO HUNT

TECHNICAL FIELD OF THE INVENTION

The present invention relates to the general art of animal husbandry, and to the particular field of animal training.

BACKGROUND OF THE INVENTION

Dogs have historically been used in hunting. A dog is generally used to retrieve a downed animal, especially downed fowls. Often, a dog is used to identify, or point, hidden fowls so those hidden fowls can be flushed and downed while in flight. As with any skill, the dog must learn to retrieve and/or to point.

Accordingly, the training of hunting dogs has been carried out for nearly as long as dogs have been used in hunting. Hunting dog training is carried out by both professional and amateur dog trainers. The skills required to efficiently and reliably retrieve and/or point are often only as good as the training. Presently, training techniques can be inefficient and are often less than effective.

Some of these training techniques include throwing sticks or other such objects and teaching the dog to retrieve such thrown objects. These techniques have several inadequacies with regard to teaching efficient and reliable retrieving of downed birds. For example, the dog does not learn how to approach a bird that may be moving, or how to properly pick up such a bird, or the like.

Accordingly, there is a need for a means and a method for efficiently training a dog to effectively and reliably retrieve and/or point.

Some improved techniques include using an object that has the general appearance of a bird. These improved techniques do improve the efficiency of the training, but are still not as efficient as possible because they do not teach the dog how to approach a downed bird that may still be moving.

Still further improvement in dog training efficiency can be achieved by attaching a tether to the thrown object and moving that object as the dog approaches it. This will teach the dog how to approach a downed bird that may still be moving.

While improving the efficiency of dog training, the just-mentioned technique still has several shortcomings.

Any learned skill will degrade over time if it is not constantly refreshed and reinforced. Therefore, to ensure maximum effect, a hunting dog's skills should be refreshed and reinforced on a consistent basis. However, most presently-used training techniques are very much like work and are not totally enjoyed by either the dog or the trainer. As a result, hunting skills of many hunting dogs degrade due to lack of continued training.

Therefore, there is a need for a means and a method for efficiently training a dog to effectively and reliably retrieve and/or point in a manner that permits efficient and effective reinforcement of learned skills.

A further shortcoming of present training techniques concerns the development of a hunting dog's sense of smell. Hunting dogs rely on their sense of smell during a retrieving and/or pointing procedure. If the object used to train the dog does not have the proper scent, the training is incomplete and hence not as efficient and effective as possible.

Furthermore, if a dog is not familiar with the object being thrown during the retrieval training, the training will have to begin by familiarizing the dog with the object. This slows the training process and makes it less efficient. An unfamiliar object may make the training of pointing very inefficient as well.

Therefore, there is a need for a means and a method for efficiently training a dog to effectively and reliably retrieve and/or point which uses an object that the dog is familiar with.

Often, due to the inefficiencies associated with present training techniques, the training procedure is not as pleasant for the dog as it could be. The more pleasant the training process, the more efficient and effective it will be both for the dog and for the trainer.

Therefore, there is a need for a means and a method for efficiently training a dog to effectively and reliably retrieve and/or point which is as pleasant as possible for both the dog and for the trainer.

Since hunting dogs can be a large investment in both time and money for many hunters, it is desirable to be able to use dog for hunting as soon as possible. However, due to the deficiencies of many training techniques, some dog training often can only begin after the dog ages out of the puppy stage and grows into a full grown dog. The AKC as well as many veterinarians have definitions of puppy and full grown dog." Such definitions are known to dog owners, trainers and handlers. Such definitions are adopted here and are incorporated herein by reference. Generally, for hunting purposes, a dog is considered as a puppy for approximately its first year of life and then is considered as a fully grown dog. Still further, for hunting purposes, a dog's sense of smell does not fully develop until that dog is approximately two years old.

Therefore, there is a need for a means and a method for efficiently training a dog to effectively and reliably retrieve and/or point with the training beginning as early as possible.

OBJECTS OF THE INVENTION

It is a main object of the present invention to provide a means and a method for efficiently training a dog to effectively and reliably retrieve and/or point.

It is another object of the present invention to provide a means and a method for efficiently training a dog to effectively and reliably retrieve and/or point which is pleasant for the dog and for the trainer.

It is another object of the present invention to provide a means and a method for efficiently training a dog to effectively and reliably retrieve and/or point and which training begins as early as possible.

It is another object of the present invention to provide a means and a method for efficiently training a dog to effectively and reliably retrieve and/or point which can be used to reinforce hunting skills.

It is another object of the present invention to provide a means and a method for efficiently training a dog to effectively and reliably retrieve and/or point and which uses an object that the dog is familiar with.

SUMMARY OF THE INVENTION

These, and other, objects are achieved by a means and a method for training a dog to hunt and which begins the training as play yet uses a bird-like object or unit for the play. The play begins when the dog is still a puppy and gradually focuses the play into hunting, retrieving and/or pointing steps while the puppy still associates the technique with play. The bird-like unit is first used to play with the puppy so the puppy associates the unit with play. After the puppy associates the unit with play, the unit is used to teach the various skills required of a hunting dog.

The unit has a pocket into which scent can be placed. This scent is used as soon as the dog's sense of smell is developed, such as when the dog is approximately two years old, and will make training even more efficient and effective.

Because the unit and technique are associated with play, training can begin very early and can continue throughout the dog's life. Thus, the training will not only be efficient and effective in teaching the skills, it will be very thorough as constant reinforcement can occur since such reinforcement will be pleasant and fun for both the dog and the trainer.

BRIEF DESCRIPTION OF THE DRAWING FIGURES

FIG. 8 shows the dog training method of the present invention.

DETAILED DESCRIPTION OF THE PREFERRED EMBODIMENT OF THE INVENTION

Figure 1:
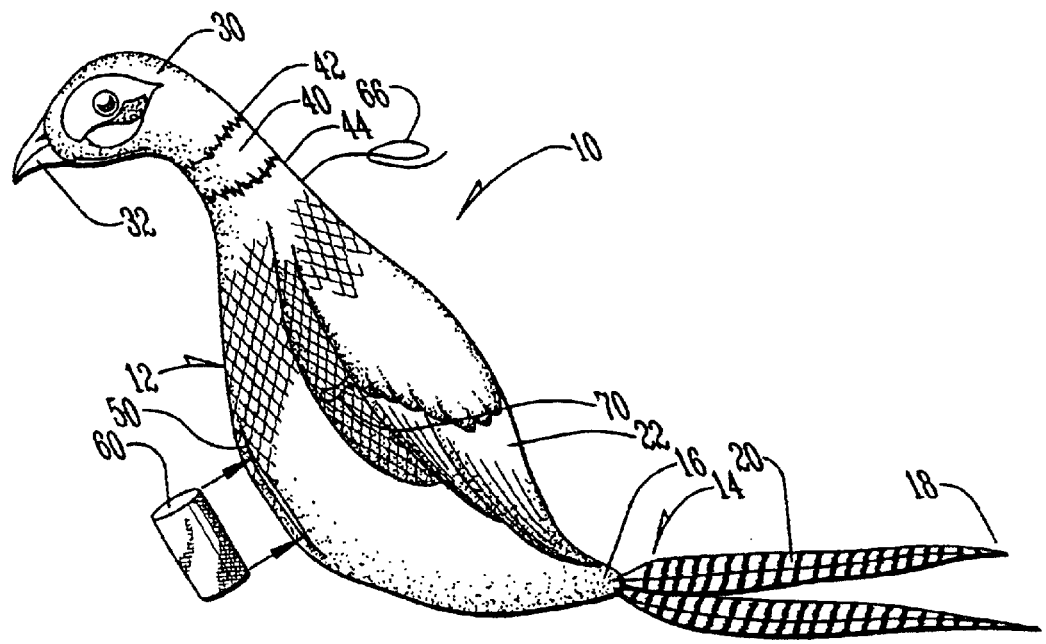
FIG. 1 shows a bird-like unit that is used to train a dog to hunt and to reinforce such learned skills. The unit shown in FIG. 1 represents a pheasant.

Other objects, features and advantages of the invention will become apparent from a consideration of the following detailed description and the accompanying drawings.

Referring to FIGS. 1–5, it can be understood that the present invention includes a unit 10 for training dogs to hunt. The unit is used to teach all of the skills associated with retrieving, pointing and the like associated with hunting. Unit 10 comprises a body 12 shaped like the body of a particular fowl. The body is made of cloth and has a polyester filling so it has the feel of a particular fowl in the dog's mouth. A tail section 14 is located on one end 16 of body 12 and is shaped and sized to correspond to the shape and size of a tail of the particular fowl. The tail section includes a distal end 18 that can have tail feather-like elements 20. The unit can be lightweight so a puppy can easily handle it.

Figure 2:
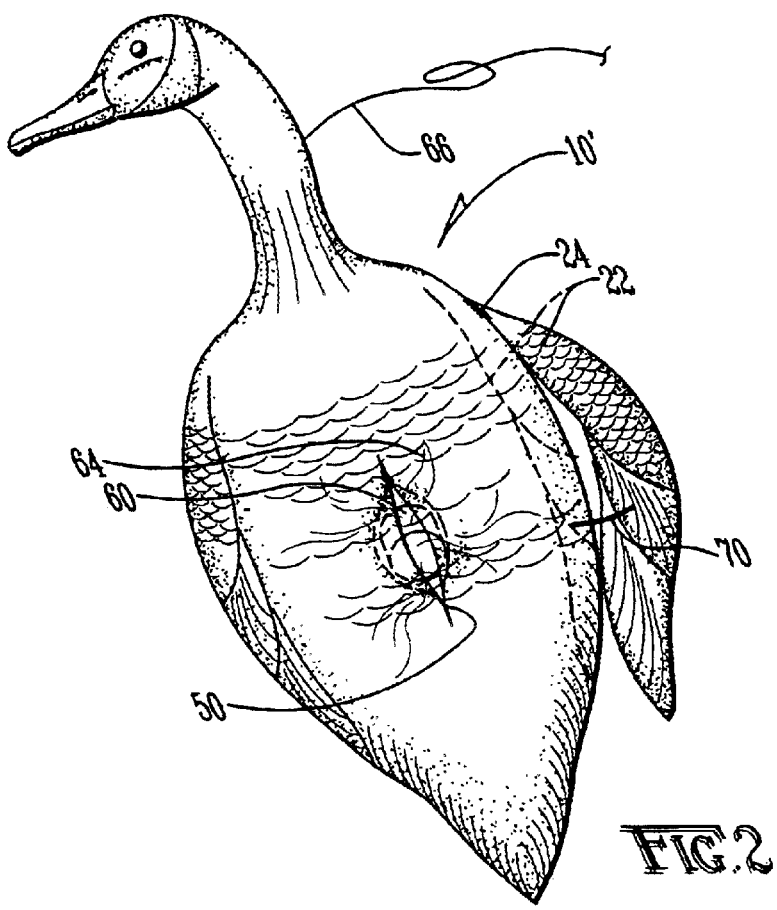
FIG. 2 is a bird-like unit representing a Canada Goose.

Two wings, such as wing 22 are attached on the body. Each of the two wings is being shaped and sized to correspond to the shape and size of a wing of the particular fowl. As indicated in FIG. 2, at least one wing of the two wings is hingeably connected to the body at a proximal end 24 to move between a first orientation shown in full lines in FIG. 2 in which the wing has at least a portion thereof spaced apart from the body and a second orientation shown in dotted lines in FIG. 2 in which the wing is fully in contact with the body.

A head 30 is shaped and sized to correspond to the shape and size of a head of the particular fowl, and a beak 32 is located on the head. The beak is shaped and sized to correspond to the shape and size of a beak of the particular fowl. A neck section 40 connects end 42 of the head to end 44 of the body. The neck section is shaped and sized to correspond to the shape and size of a neck section of the fowl particular fowl.

The unit is weighted so a puppy can easily carry it.

Figure 3:
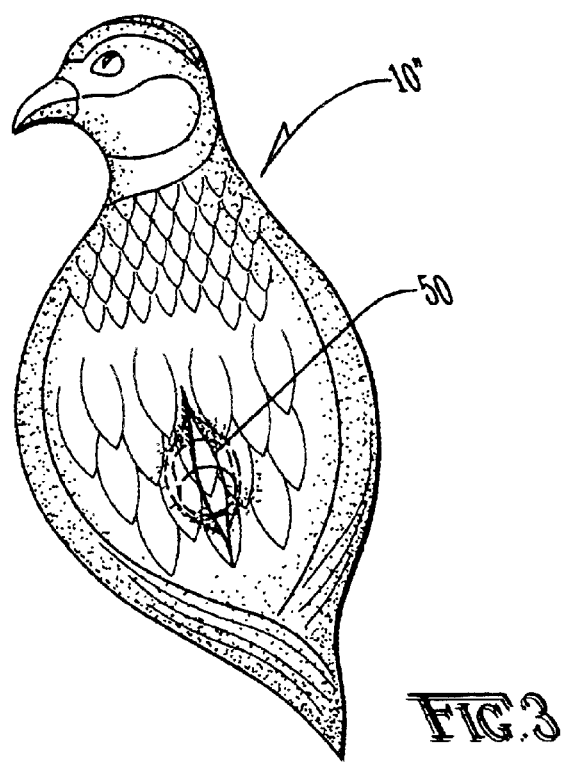
FIG. 3 is a bird-like unit representing a Quail.
Figure 4:
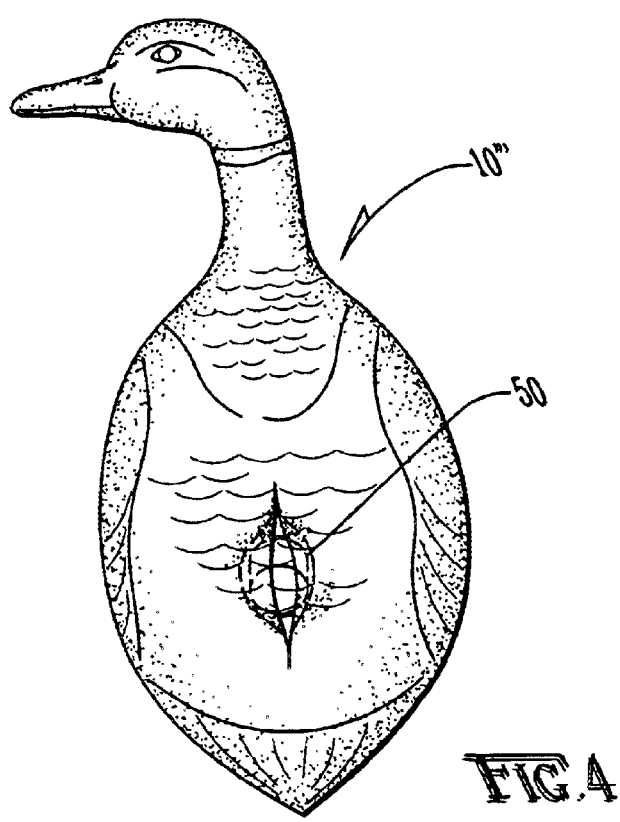
FIG. 4 is a bird-like unit representing a Mallard Duck.

A pocket 50 is located in the body. The pocket is best shown in FIGS. 2–4. The pocket is contained inside the body in a use condition as shown in FIGS. 2–4. The pocket is formed of a liquid-absorbing material, such as cotton, terrycloth or the like.

A scent 60 is shown in a packet in FIG. 1 and is indicated in FIG. 2 and is associated with the particular fowl. The scent has vapor 64 associated therewith and is impregnated in the pocket in a use condition of the scent. The vapor of the scent will be detected by the dog using its sense of smell. It is also noted that scent 60 can be any commercially available scent and those skilled in the art will understand what scent is to be used based on the teaching of this disclosure. The scent packet can have porous walls and can be inserted as a packet into the pocket. The scent can also be poured from the packet into the pocket to be absorbed by the material of the pocket.

A tether 66, such as a fishing line or the like is tied to the body when the dog is being taught to point and retrieve and is being taught how to approach a bird that may move as the dog approaches. As will be understood from this discussion, unit 10 is thrown with the tether attached and can be moved as the dog approaches by means of the tether.

A further tether 70 can be used to tie wing 22 to body so the wing will not fall off during use.

Unit 10 shown in FIG. 1 simulates a pheasant. However, as those skilled in the art will understand, any type of bird can be simulated. For example, ss shown in FIG. 2, unit 10' can simulate a Canada Goose, unit 10" can simulate a quail, and unit 10" can simulate a Mallard Duck.

Figure 5:
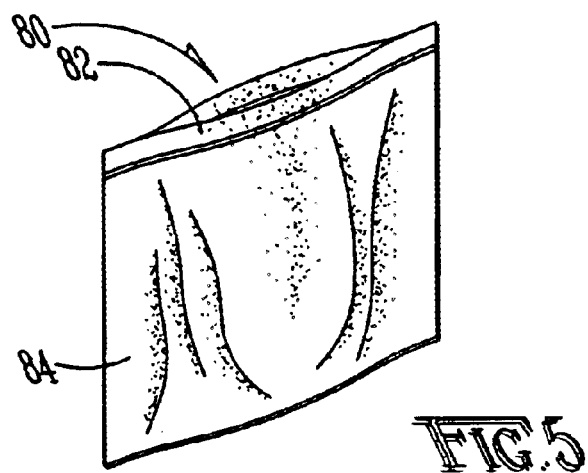
FIG. 5 shows an air-tight container for storing the unit when the unit is not in use.

An air-impervious container 80 is shown in FIG. 5. The container can be a flexible bag, a zip lock bag, or the like and can include a top 82 securely, yet releasably, attached to a body 84. The unit is contained in the container when it is not in use so the unit does not pick up extraneous smells.

The present invention is also embodied in a method of training a puppy/dog. The term "puppy/dog" is used because the training begins when the animal is a puppy, but continues after the animal reaches maturity. The mature animal will be trained to reinforce its early training, and some of the training occurs after the animal reaches full growth. That is, the animal will reach full growth in about one year, yet its sense of smell may not be fully developed for as much as two years. Therefore, some of the training will occur after the animal reaches full growth, but before the animal's sense of smell is fully developed; whereas, some of the training will occur after the animal has reached full growth.

The training method is shown in FIG. 8 and comprises the steps of providing fowl-like unit 10 and using the unit to play with the puppy/dog until the puppy/dog identifies the unit as a toy. Continued use of the unit will be associated with play and thus even after the animal has reached full maturity, it will associate unit 10 with a toy and play. Thus, further training and reinforcement of training will be pleasant as the animal will think it is playing. However, the puppy should be prevented from chewing on the unit as that habit will be detrimental to the overall hunting skills of the animal.

With regard to the puppy identifying the unit 10 as a toy, it is noted that this step can be begun as soon as the puppy is born or is only weeks old. The unit is held by the trainer and is shown to the puppy. The unit is also pushed against the puppy, or the unit is used to "rough house" with the puppy or the like. However, as soon as the puppy bites the unit, the trainer quickly places his or her hands in the puppy's mouth and pries the puppy's mouth open so the puppy does not chew-on the unit. This process is continued until the puppy learns to play with the unit without biting the unit. Every time the puppy releases the unit, it can be rewarded, as by being told good dog" or even given a treat. The puppy is never permitted to play tug with the unit. If the puppy tries to tug the unit, the puppy is told he or she is "bad" and punished accordingly. Later, when the unit is used to teach the puppy to retrieve, the same process is used to prevent the puppy from chewing on the unit or from playing tug with the unit. It is noted that the dog's name can be used during this process; however, the process can be carried out even before the dog has been named.

It is also important that the unit being used to train the animal have the appearance of an actual bird that will be retrieved or pointed. This will teach the animal to seek the prey during actual conditions. If only a part of the bird is used, such as only a wing or the like, the animal may become confused in the field when an actual bird is being hunted. The unit of the present invention duplicates an anatomically correct bird and thus will accurately simulate the actual conditions that will be encountered by the animal in the field. This will produce a much more effective training process.

The unit is stored in air-impervious container 80 when the unit is not in use in order to preserve the proper and desired scent and to prevent extraneous scents from being picked up by the unit. The unit will thus retain its unique character for the animal being trained.

After the puppy/dog identifies the unit as a toy, the animal can be taught to find and point and retrieve. The unit is thrown into locations that are spaced apart from the puppy/ dog and the animal is allowed to chase and catch the unit after the unit has been thrown. Since many dogs quickly learn to find and chase, this is an easy skill for the puppy to learn. The unit can be thrown close to the dog initially until the dog learns to catch the unit. Then the distance can be gradually extended. Appropriate commands can also be given at this time so the dog will associate the commands with the retrieval of the unit.

After the puppy/dog has caught the unit, the animal is called to retrieve the unit. Again, this is an easy skill for a puppy to learn.

Figure 6:
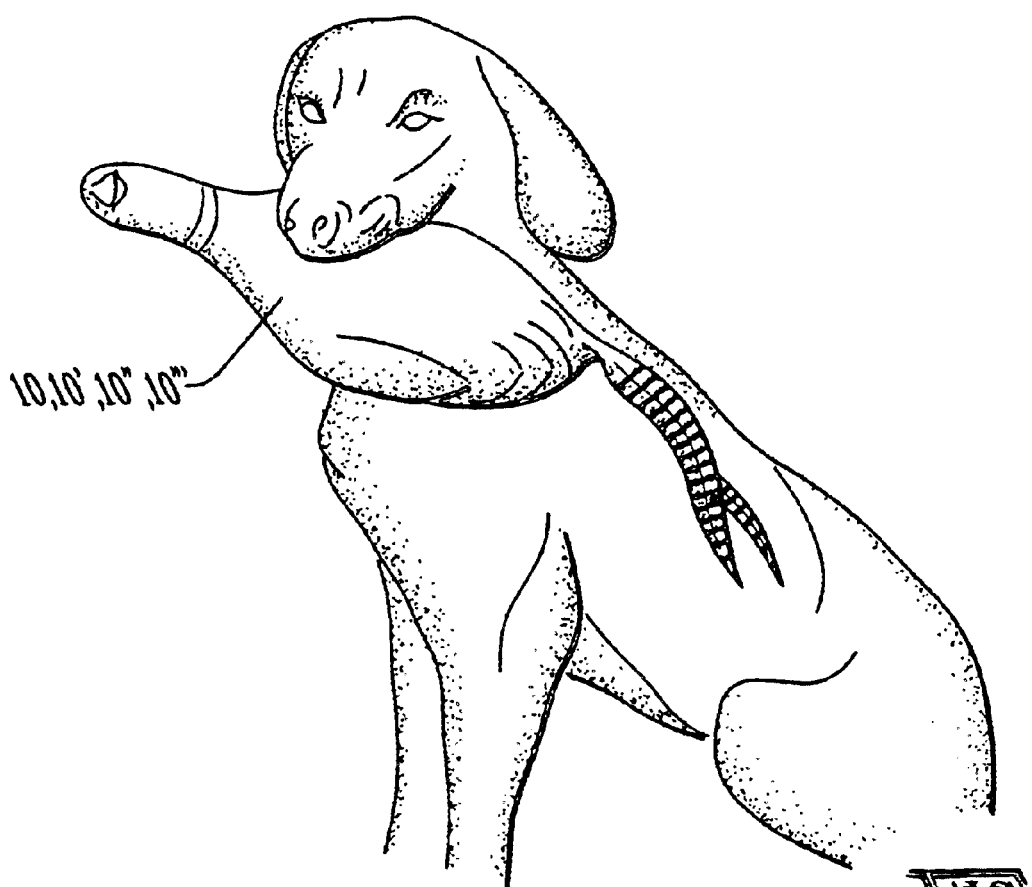
FIG. 6 shows a dog with a training unit in its mouth.

The animal is then taught to bring the unit back to a person who has thrown the unit after the puppy/dog has caught the unit when the puppy/dog is called to retrieve the unit. The animal still associates this step with play and should be receptive to learning this skill. A retrieved unit is shown in FIG. 6.

After the puppy/dog has been taught to bring the unit back to the person who has thrown the unit, the animal is taught to identify and find the thrown unit. This is done by throwing the unit when the attention of the puppy/dog is distracted away from the unit. The animal is told to find the unit. This is a small step in the overall skill and can be easily taught since the animal already knows how to find and retrieve the unit. Small steps are the best way to learn a skill, and that is how this method is carried out.

After the puppy/dog has been taught to identify and find the thrown unit, the animal is taught use its sense of smell by adding fowl-like scent to the unit before the unit is thrown. The fowl-like scent is associated with the particular fowl. As discussed above, this step may not occur for as much as two years into the training since the dog's sense of smell may not be fully developed for as much as two years. However, the step can be carried out earlier if the dog's sense of smell begins to develop earlier. It will depend on the dog as to when this step can be carried out.

To simulate actual field conditions, the unit has a wing, or both wings, that will flap with respect to the body of the unit. These wings can move as discussed above with reference to FIG. 2. This will teach the animal to pick up a downed bird which may have wings that move away from its body when the dog grasps the bird. The wing can be tied to the body so it will not fall off after repeated uses of the unit.

The dog can be taught to react to a gun by first firing a cap gun as the unit is being thrown and then firing a shot gun as the unit is being thrown.

Figure 7:
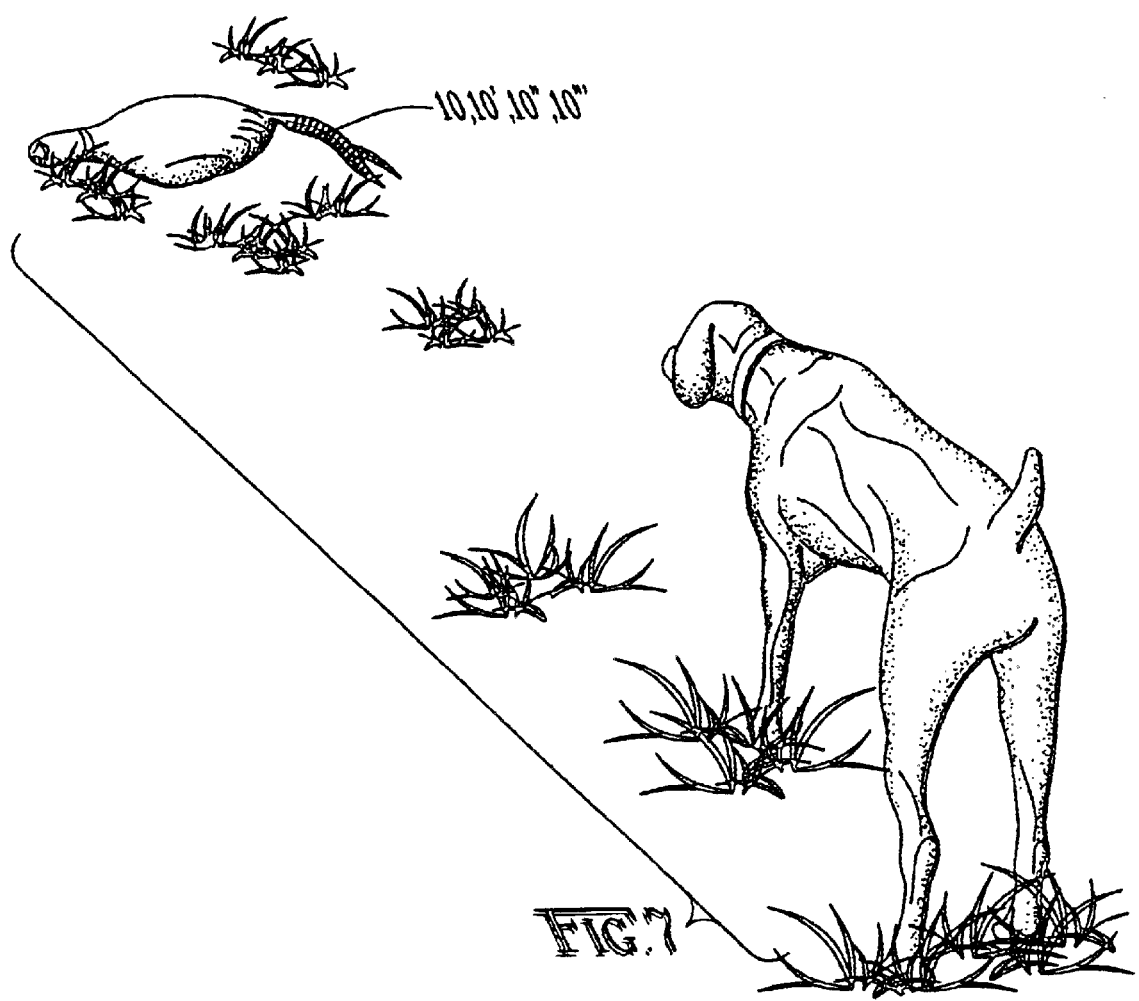
FIG. 7 shows a dog pointing the training unit.

To teach the animal to approach a bird that may still be moving, the training method of the present invention includes a step of attaching a tether to the unit before it is thrown and then moving the unit as the animal approaches it. This step can also serve as part of the method for teaching the dog to point. A dog on point is shown in FIG. 7.

Various hunting commands can be used for each step of the overall process to teach the dog to execute a particular step on command. For example, after it has been thrown while the dog is not paying attention to the unit, the command "hunt them up" can be given as a signal to find the unit. This can also be used during the steps in which the dog is taught to point. Once the dog has found the unit, the trainer can teach the dog proper pointing posture.

Other commands will occur to those skilled in the art based on the teaching of this disclosure and the disclosure is intended to cover such other commands as well.

It is also noted that the method of the present invention can be carried out indoors or outdoors and can be used throughout the dog's life to refresh the skills of the dog. Since the dog associates the training and the unit with play, such skill refreshing and reinforcing steps will be pleasant for both the dog and for the trainer.

It is understood that while certain forms of the present invention have been illustrated and described herein, it is not to be limited to the specific forms or arrangements of parts described and shown.

What is claimed is:

1. A unit for training dogs to hunt comprising:
A) a body shaped like the body of a particular fowl, said body being made of cloth and having a polyester filling;
B) a tail section on one end of said body said tail section being shaped and sized to correspond to the shape and size of a tail of the particular fowl;
C) two wings on said body, each of said two wings being shaped and sized to correspond to the shape and size of a wing of the particular fowl, at least one wing of said two wings being hingeably connected to said body to move between a first orientation having at least a portion of the one wing spaced apart from said body and a second orientation having the one wing fully in contact with said body;
D) a head which is shaped and sized to correspond to the shape and size of a head of the particular fowl;
E) a beak on said head, said beak being shaped and sized to correspond to the shape and size of a beak of the particular fowl;
F) a neck section connecting said head to said body, said neck section being shaped and sized to correspond to the shape and size of a neck section of the fowl particular fowl;

G) a pocket in said body, said pocket being contained in said body in a use condition, said pocket being formed of a liquid-absorbing material; and H) a scent associated with the particular fowl, said scent having vapor associated therewith and being impregnated in said pocket in a use condition of said scent.

2. The unit defined in claim 1 further including a tether tied to said body.

3. The unit defined in claim 1 further including a tether tying the one wing to said body.

4. The unit defined in claim 1 wherein the particular fowl is a pheasant.

5. The unit defined in claim 1 wherein the particular fowl is a Mallard Duck.

6. The unit defined in claim 1 wherein the particular fowl is a Canada Goose.

7. The unit defined in claim 1 wherein the particular fowl is a Quail.

8. The unit defined in claim 1 further including an air-impervious container which contains said body when said body is not in use.

9. A unit for training dogs to hunt comprising:

A) a body shaped like the body of a particular fowl, said body being made of cloth;

B) a tail section on one end of said body, said tail section being shaped and sized to correspond to the shape and size of a tail of the particular fowl;

C) two wings on said body, each of said two wings being shaped and sized to correspond to the shape and size of a wing of the particular fowl, at least one wing of said two wings being hingeably connected to said body to move between a first orientation having at least a portion of the one wing spaced apart from said body and a second orientation having the one wing fully in contact with said body;

D) a head which is shaped and sized to correspond to the shape and size of a head of the particular fowl;

E) a beak on said head, said beak being shaped and sized to correspond to the shape and size of a beak of the particular fowl;

F) a neck section connecting said head to said body, said neck section being shaped and sized to correspond to the shape and size of a neck section of the fowl particular fowl;

G) a pocket in said body, said pocket being contained in said body in a use condition, said pocket being formed of a liquid-absorbing material; and H) a scent associated with the particular fowl, said scent having vapor associated therewith and being impregnated in said pocket in a use condition of said scent.

* * * * *